United States Patent [19]
Habock et al.

[11] 3,764,815
[45] Oct. 9, 1973

[54] START-UP CONVERTER

[75] Inventors: Adolf Habock, Erlangen; Kurt Fork, Frauenaurach, both of Germany

[73] Assignee: Siemens Aktiengesellschaft, Munich, Germany

[22] Filed: Mar. 3, 1972

[21] Appl. No.: 231,543

[30] Foreign Application Priority Data
Mar. 6, 1971 Germany.................. P 21 10 747.1

[52] U.S. Cl.......................... 290/52, 290/38, 321/2, 321/5
[51] Int. Cl........................ F01d 15/10, F02n 11/00
[58] Field of Search................................ 290/38, 52

[56] References Cited
UNITED STATES PATENTS

| | | | |
|---|---|---|---|
| 3,187,188 | 6/1965 | Adkins et al...................... | 290/52 X |
| 3,264,482 | 8/1966 | Clark et al......................... | 290/52 X |
| 3,271,579 | 9/1966 | Erismann.......................... | 290/38 R X |
| 3,591,844 | 7/1971 | Schonebeck...................... | 290/52 X |
| 3,629,597 | 12/1971 | Wiley et al....................... | 290/38 X |

*Primary Examiner*—William M. Shoop, Jr.
*Attorney*—Hugh A. Chapin

[57] ABSTRACT

Apparatus for starting up the turbine of a gas turbine unit or a pump storage unit having a generator coupled to the turbine, which includes a frequency converter of variable output frequency which connects a supply voltage to the generator during start-up. The generator is accelerated by the frequency converter as a synchronous motor until a predetermined speed is reached. The frequency converter is a static semiconductor converter. The starting-up apparatus eliminates the need for providing a separate starter motor for the turbines. According to a further embodiment, the semiconductor converter includes a speed control arrangement for maintaining the generator shaft at an adjustable, desired speed until the turbine unit is either accelerated by the frequency converter to the predetermined speed or is further decelerated or stopped. The speed control arrangement avoids the very rapid accelerations and decelerations of the turbine shaft otherwise accompanying start-up and shut down, thereby preventing distortions in the turbine shaft caused by non-uniform heating and cooling.

23 Claims, 7 Drawing Figures

START-UP CONVERTER

BACKGROUND OF THE INVENTION

1. Field of the Invention

The present invention relates to gas turbine units and pump storage units driven by turbines, and more particularly to apparatus for starting up such gas turbine and pump storage units.

2. Description of the Prior Art

The starting up of gas turbine units and pump storage units driven by turbines is conventionally being accomplished by means of starter motors with torque converters. During the starting up process of the gas turbine units or the pump storage units, the starter motors must be coupled with such turbines. This coupling requires a considerable extension of the shaft system of the turbine units and brings with it an appreciable additional requirement for foundations and enclosed space.

Also, gas turbine units, steam turbine units and phase shifters are commonly provided in present day systems with a supplemental rotating device. This rotating device serves the purpose of rotating the shaft of the turbine unit, prior to starting the latter up and after shutting it down, at a sufficiently high speed commonly referred to as the turning speed. Non-uniform heating or cooling of the shaft and the accompanying distortion of the same are thereby prevented. If one were to stop the turbine shaft, which had become very hot at the nominal speed, very quickly after shutting down the turbine unit, a vertical heat stratification would develop which would bend the center of the shaft upward. On the other hand, if one were to accelerate the shaft of a large turbo unit very rapidly from standstill to the nominal speed, an unsteady start-up would result.

Hydraulic rotating devices are commonly employed which drive the turbine shaft at the turning speed and thereby prevent non-uniform heating. For this purpose, a rotor is rigidly connected with the shaft and during the turning operation is acted upon by pressurized oil. The oil is supplied by an auxiliary oil pump and is fed via a shut-off valve to nozzles which direct the oil jet to buckets of the rotor. With the shut-off valve fully open, a turning speed of 80 to 120 RPM is generally reached with an oil-hydraulic rotating device.

SUMMARY OF THE INVENTION

It is an object of the present invention to eliminate the need for starter motors with their accompanying torque converters for the starting up of gas turbine units and pump storage units driven by turbines.

It is another object to provide a starting-up arrangement for a generator coupled to a turbine.

It is a further object of the invention to develop a starting-up arrangement of the type described above, but without using the hydraulic rotating device conventionally employed.

These, and other objects, are achieved by the present invention which provides a starting-up arrangement for a generator coupled to a turbine, particularly for a gas turbine unit or a pump storage unit with a pump turbine. During the starting-up operation, the generator is connected to a supply voltage via a frequency converter of variable output frequency and is accelerated by the frequency converter as a synchronous motor until a predetermined speed is reached. The frequency converter is a static semiconductor converter. By operating the generator of the turbine unit in this manner as a motor during the start-up operation with acceleration accomplished by a converter, the conventional use of separate starter motors is unnecessary, and the disadvantages associated with the use of separate starter motors, including the high inrush current peaks produced during start-up, are avoided.

Preferably, the semiconductor converter consists of a rectifier which can be connected to a power supply system on the input side, and an inverter which can be connected to the generator on the output side. The inverter is triggered during starting-up by a magnet-wheel position transmitter coupled with the shaft of the generator, as a function of the position of the shaft. The generator can be accelerated up to the predetermined disengagement or nominal speed, respectively. By timing the inverter by means of the magnet-wheel position transmitter coupled with the generator shaft, assurance is provided whereby the generator always runs synchronously with respect to the inverter that feeds it.

The above-described elimination of a separate starter unit according to the present invention results in freedom of physical arrangement and good adaptability to the required and available starting power. In individual operation, the system-controlled part of the converter can be used as the main exciter converter for the generator; however, several generators can also be started up successively with one and the same converter. Through the use of the converter, if required, it is also possible to brake the generator in order to assure a rapid transition from generator operation to pump operation or from phase shifter operation to generator operation for gas turbine units.

The converter consists, preferably, of a rectifier and an inverter which are connected with each other via an intermediate DC circuit. The inverter can be designed as a self-commutating inverter with quenching arrangements. In order that the inverter will commutate in the absence of the commutation voltage, for instance, at a very low generator speed, the intermediate-circuit current can also be made zero.

According to a further embodiment of the invention several turbine units can be maintained in rotation at a low speed with a single starting-up device of the type described. Also, a method is provided wherein one or also several turbo units can be successively brought up to speed, provision being made that during the starting-up of one turbo unit the turbo set or turbo sets that have not yet been brought up to speed can be rotated at low speed.

According to this further embodiment, the semiconductor converter which is used for starting-up and, optionally, also for braking, can be designed so that it can also be used as an electrical rotating device which can maintain the shaft of the generator, for a period of time selectable at will, at an adjustable, desired speed. This desired speed can be set within the range of speeds between zero and the nominal speed, such as at a desired "turning speed" which is a few percent of the nominal speed of the generator. With the above-described starting-up arrangement the invention therefore provides a speed-control arrangement at the semiconductor converter for keeping the speed of the generator shaft constant.

The final control member of the speed-control arrangement comprises the rectifier in conjunction with its control unit. The armature current of the generator is then controlled via the rectifier in such a manner that the speed of the shaft of the generator is held at the set desired speed value. The set desired speed, particularly the desired turning speed, is held until the turbo unit is either accelerated by the starting-up arrangement up to a predetermined speed, which may correspond to the separation, nominal or overdrive speed, or until the turbo unit is further decelerated or stopped.

One further advantage of the invention is therefore to be seen in the fact that the previously employed rotating device, which requires maintenance and is expensive, can be dispensed with. Also avoided by the present invention are the ventilation losses, which until now were caused in the turning operation by the bucket wheel and were converted into heat which amounted, for example, to about 70 kW in a turbo set of 100 MW input. The elimination of the hydraulic rotating device further leads to a considerable shortening and, therefore, reduction in mass of the shaft. This shortening can amount to 15 cm or more.

Still another embodiment of the invention comprises a tachometer for determining the actual speed of rotation of the shaft, with the tachometer and a reference-speed setting device with adjustable desired speed being connected to a comparator. The comparator is connected to a speed-of-rotation transmitter. The output signal of the speed control is fed, as the reference value of the armature current, to a first input of an armature current comparator, the second input of which is fed by a probe for the actual value of the armature current. The armature current comparator is connected via an armature current regulator to the control unit of the rectifier.

In this latter embodiment, a maximum output limit, which is dependent on the actual speed, can be preset into the speed control via a function generator. It is possible to remove the speed control from the connection between the function generator and the control unit by means of a double-throw switch when changing to another mode of operation.

A tachometer of any design can be used for determining the speed of rotation. No stringent requirements as to accuracy need to be placed on it. However, it is preferable to provide as the tachometer the already available rotor-position transmitter in conjunction with a frequency-voltage converter connected to its output.

Several generators can be held simultaneously at low speeds without a hydraulic rotating device by means of the starting-up arrangement, wherein a number of generators are connected to the converter in cyclic succession, and the respectively connected generator is accelerated to a preset release speed and subsequently runs down uncontrolled while disconnected from the inverter until it is accelerated again during the next cycle to the release speed.

A method for successively accelerating one or several generators until they reach a preset speed, which may be either the separation speed, the nominal speed or an overdrive speed, is provided wherein, at a first point in time a generator, selected from a number of generators, is connected to the inverter and is rotated at a preset desired speed with the speed control arrangement effective. From a second point in time on, this generator is accelerated until a predetermined release speed is reached. From a third point in time on, another generator is accelerated to the predetermined speed by means of the converter, while the selected generator is separated from the converter and runs down uncontrolled. From a fourth point in time on, this generator is again connected to the inverter, with the speed control arrangement enabled.

DESCRIPTION OF THE PREFERRED EMBODIMENTS

Figure 1:
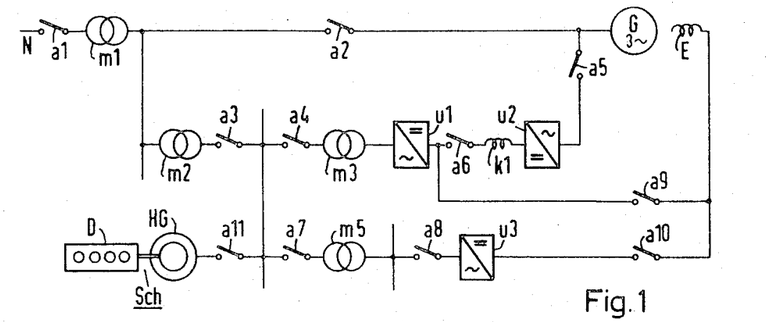
FIG. 1 shows the basic starting-up circuit arrangement for a generator coupled to a turbine, illustrative of the invention.

Referring to FIG. 1, a generator G is operated on starting-up as a converter motor, i.e., as a converter-fed synchronous machine, which is controlled by timing (not shown in FIG. 1) an inverter $u2$ as a function of the position of a magnet-wheel position transmitter (not shown in FIG. 1) and thereby assumes the properties of a DC machine. The magnet-wheel position transmitter, which is attached on the shaft of the generator G in a force-coupled manner, gives commutation commands to the inverter $u2$ of the converter $u1$, $u2$ in such a manner that the excitation field produced by the exciter winding and the flux through the armature of the generator G produce a torque in the desired direction.

The flux through the generator armature is advanced by the magnet-wheel position transmitter as soon as the magnet-wheel of the generator G has traversed an angle of 60 electrical degrees. The function of the machine-timed inverter $u2$ therefore corresponds to that of the commutator of a DC machine which advances the flux through the armature as a function of the rotor position. It is therefore assured that the generator G always runs synchronously with the feeding inverter $u2$ and difficulties regarding the stability of the power transmission cannot occur. After a predetermined speed is reached, from which the turbine can accelerate the turbo set, i.e., at the disengagement speed, the converter $u1$, $u2$ is disconnected from the generator G and the rectifier $u1$ is connected to the exciter winding E of the generator G as the excitation converter. The generator G is excited to full voltage by the rectifier $u1$ until it reaches the nominal speed $n_N$.

Figure 3:
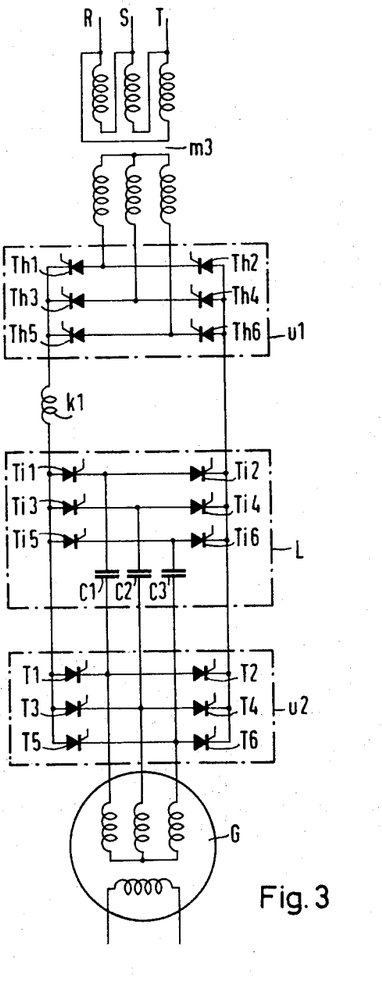
FIG. 3 shows a circuit diagram of the inverter.

DC power is supplied from an intermediate DC circuit having a choke $k1$ to the inverter $u2$, which feeds the generator G. The intermediate DC circuit is fed from a three phase system N via a converter transformer $m3$ and the system-controlled rectifier $u1$. The associated inverter $u2$ may contain a quenching arrangement L, shown in FIG. 3, which causes the current to pass from one winding circuit R, S, T to the next, as long as the generator G itself is not able to deliver the required commutation voltage. Quenching capacitors C1, C2, C3 included in the inverter $u2$ are changed, prior to starting up, to the required voltage via an auxiliary device, not shown in detail. The rectifier $u1$, the inverter $u2$ as well as the intermediate DC circuit with the choke $k1$ are shown in detail in FIG. 3. The rectifier $u1$ and the inverter $u2$ are shown in FIG. 3 in a six-pulse bridge circuit. For light dynamic requirements, the flux through the generator G can also be advanced by timing the intermediate DC circuit.

During the acceleration of the generator G, the exciter winding E is excited from an auxiliary DC source, such as an auxiliary exciter rectifier $u3$, initially with approximately the nominal exciter current, in order to make the starting torque large. So that the converter $u1$, $u2$ need not be designed for the full generator voltage, an armature voltage control, shown in FIG. 2, becomes active when the permissible output voltage of the inverter $u2$ is reached, which reduces the excitation current of the generator G to the extent that this permissible voltage value is not exceeded. In this fashion, the generator G is accelerated to the disengagement speed, in this case equal to one-half the nominal speed, from which point the turbine can accelerate the entire turbine set to the full nominal speed $n_N$. When this disengagement speed is reached, the generator G is disconnected from the converter $u1$, $u2$ and the rectifier $u1$ is connected to the exciter winding E as the excitation converter in place of the auxiliary exciter rectifier $u3$.

After it has been brought up to speed, the generator G feeds into the three-phase system N via a generator circuit breaker $a2$, a section transformer $m1$ and a breaker $a1$. Between the section transformer $m1$ and the generator breaker $a2$ is connected the feed line for an internal-consumption transformer $m2$, which supplies a converter transformer $m3$ for the converter $u1$, $u2$ via two breakers $a3$ and $a4$. The output of the rectifier $u1$ of converter $u1$, $u2$ is connected via a breaker $a6$ with the intermediate DC circuit containing the choke $k1$, and the inverter $u2$ is connected via a breaker $a5$ with the generator G. The output of the rectifier $u1$ is furthermore connected with the excitation winding E via a breaker $a9$. FIG. 1 further shows the auxiliary starting arrangement Sch, consisting of a Diesel drive D and an auxiliary generator HG, the output of which is capable of feeding an internal-consumption transformer $m5$ via breakers $a11$ and $a7$. Transformer $m5$ is connected at its output side to supply the exciter winding E via the breaker $a8$, the auxiliary excitation rectifier $u3$ and the breaker $a10$. The junctions of the breakers $a3$ and $a4$, as well as $a11$ and $a7$ are connected with each other.

Figure 2:
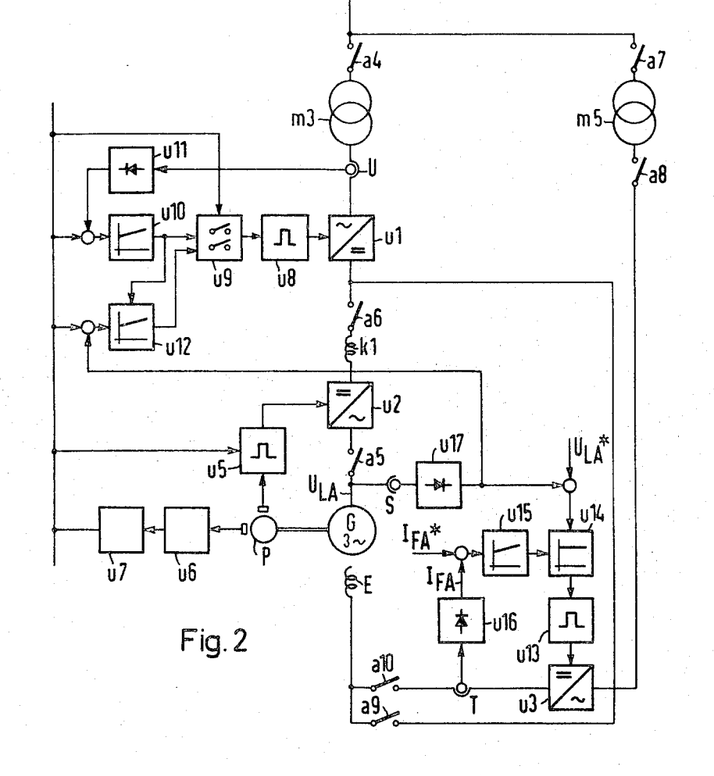
FIG. 2 shows the control and regulating devices used in the circuit shown in FIG. 1.

FIG. 2 illustrates the control and regulating arrangement for the basic configuration according to FIG. 1. Similar components in the two Figures are labelled with the same reference symbols.

According to FIG. 2, the inverter $u2$ is timed as a function of the position of the magnet wheel of the generator G, for which purpose the shaft end of the generator G is equipped with the magnet-wheel position transmitter P. The magnet-wheel position transmitter P may consist of an optical or inductive transmitter, or of magnetized discs which are scanned by Hall probes. The signals of the magnet-wheel position transmitter P are fed, on the one hand, to a central start control via a frequency-voltage converter $u6$ as the speed sensor and, on the other hand, to the inverter $u2$ of the converter $u1$, $u2$ via a pulse distributor $u5$. For reasons of stability it may be advantageous to shift the pulse position of the magnet-wheel position transmitter P as a function of the speed $n$ and/or the magnet-wheel angle of the generator G.

The rectifier $u1$ of the converter $u1$, $u2$ obtains its control pulses from a control unit $u8$, the pulse position of which is determined relative to the line voltage. The output voltage of an armature current regulator $u10$ is used as the control voltage for the control unit $u8$. At the output of the armature current regulator $u10$, there is carried out a comparison between the datum value Current $I_A{}^*$ supplied by a central start control $u7$, which current $I_A{}^*$ corresponds to the permissible armature current, and the actual armature current $I_A$ carried out, which is the armature current control during starting.

In the exciter circuit of the generator G there is an armature voltage regulator $u14$ which is active during starting to limit the armature voltage $U_{LA}$ to a permissible value, thereby providing armature voltage control. At the same time, a current-limiting control $u15$ insures that a preset permissible current $I_{FA}{}^*$ cannot be exceeded.

When the generator G goes over to generator operation, the armature current control of the rectifier $u1$, via the armature current regulator $u10$, is disabled by means of an electronic switch $u9$. Simultaneously, a changeover is made to armature voltage regulation by an armature voltage control $u12$, the armature current control $u10$ now being used for limiting current.

The switching over from start-up operation to generator operation is accomplished by the central start control $u7$ which also performs the changing of the voltage and current limits, which is necessary when switching from auxiliary excitation to main exciter operation. The command for switching over is obtained from the frequency-voltage converter $u6$, which is used as the speed sensor. The actual value of the armature voltage $U_{LA}$ is determined by a probe S, comprising a potential transformer, and is rectified by a rectifier $u17$. The actual value of the excitation current $I_{FA}$ is sensed by a probe T comprising a current transformer, and is rectified by a rectifier $u16$. The control unit for the auxiliary excitation rectifier $u3$ is designated as $u13$. A probe U, also a current transformer, determines the actual value of the armature current, which is rectified by a rectifier $u11$.

To carry out a starting-up operation, the power supplies for the control and regulation are first switched on by means of the breakers $a1$, $a3$ and $a7$ prior to switching on the main circuits. The main circuits are switched on by means of the breakers $a4$ and $a8$, so that the rectifiers $u1$ and $u3$ are driven in inverter operation. For starting up, the breakers $a5$ and $a6$ for the converter $u1$, $u2$ as well as the breakers $a10$ and $a8$ for the excitation of the exciter winding E are first closed. After releasing the excitation of the auxiliary exciter rectifier $u3$ by releasing the armature voltage control $u14$ for starting, the breaker $a4$ is closed and the rectifier $u1$ is thereby enabled. By the armature current $I_A$ which now flows, the excited generator G is accelerated. The armature current $I_A$ is kept at the maximum value permissible for the converter $u1$, $u2$ during the entire starting-up operation, in order to keep the starting torque as high as possible in view of short start-up times. The exciter current $I_{FA}$ corresponds initially to approximately the nominal excitation current.

As soon as the armature voltage $U_{LA}$ of the generator G has risen to the maximum permissible value for the inverter $u2$, the armature voltage control $u14$ becomes effective and, upon further acceleration, reduces the exciter current $I_{FA}$ of the generator G to the extent that the voltage $U_{LA}$ remains constant. For reasons of stability, it may be desirable to shift the position of the inverter pulses in steps or continuously as a function of the magnet-wheel angle. If the preset speed is reached, for example, 0.5 $n_N$, the changeover from start-up operation to generator operation is effected by the central start control $u7$, the rectifiers $u1$ and $u3$ being initially blocked and the breakers $a5$, $a6$, $a4$ as well as $a8$ and $a10$ being opened without current, and the breakers $a9$ and $a4$ being closed subsequently. The rectifier $u1$ is thereby enabled again.

Instead of the armature current control by the armature current regulator $u10$, which was effective up to now, the armature voltage control $u12$ with substitute current control by the armature current regulator $u10$ now acts on the rectifier $u1$ via the control unit $u8$. The control of the auxiliary exciter rectifier $u3$ remains blocked, as is the latter itself. For faster acceleration, it is possible to execute this switchover now at the disengagement speed, for example, at the speed of 0.5 $n_N$, but to accelerate the converter $u1$, $u2$ to higher speeds for aiding the turbine, with the current reduced for reasons of commutation, and to switch over only at such higher speeds. The process itself is not changed thereby, but only the armature current datum value $I_A^*$ must be reduced corresponding to the commutation conditions. The turbo set is subsequently further accelerated by the turbine and is synchronized upon reaching the nominal speed $n_N$ by closing the breaker $a2$.

For phase shifter operation, if the converter $u1$, $u2$ is designed for a voltage smaller than the nominal voltage of the generator, the generator G must be accelerated, with the turbine disconnected, to about 5 percent above the nominal speed $n_N$ by means of the converter $u1$, $u2$. The switching from start-up operation to phase shifter operation must then take place when the generator G runs down from this overspeed of 1.05 $n_N$ to the nominal speed $n_N$. When the nominal speed is reached, the generator G is synchronized. However, if the converter $u1$, $u2$ is designed for the nominal generator voltage, the synchronization can be performed directly during acceleration by means of the converter $u1$, $u2$.

The converter $u1$, $u2$ can also be used as a braking arrangement as the generator G coasts down by controlling the inverter $u2$ as a rectifier and the rectifier $u1$ as an inverter.

FIG. 3 illustrates one embodiment of the converter $u1$, $u2$, the rectifier $u1$ of which is fed by the converter transformer $m3$ and comprises a thyristor group Th1 to Th6. The intermediate DC circuit is constituted by the choke $k1$, and the inverter $u2$ comprises the thyristor group T1 to T6. The quenching device L consists of thyristors T$i$1 to T$i$6 and capacitors C1 to C3.

The invention can be applied to gas turbine sets, water or steam turbine sets or to pump storage sets. In the case of pump storage sets, it is advisable to accelerate the generator G up to the nominal speed $n_N$, or beyond the nominal speed $n_N$, so that the generator G can be synchronized when it is running down.

Figure 4:
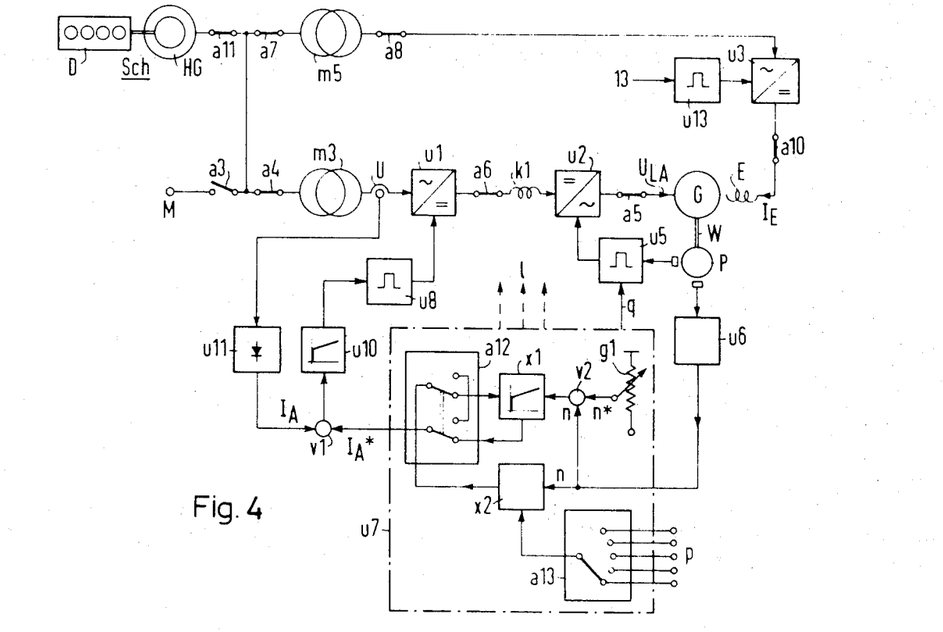
FIG. 4 shows a starting-up arrangement for a generator coupled to a turbine, the shaft of which is held at the turning speed via a speed-control circuit.

Referring to FIG. 4, there is provided, as in FIG. 1, an auxiliary (cold) starting arrangement Sch to drive the shaft W of a generator G. The auxiliary starting arrangement Sch consists of a Diesel drive D and an auxiliary generator HG coupled therewith. Auxiliary starting arrangement Sch supplies, in the operational condition shown, the main circuit via a closed circuit breaker $a11$ as well as the excitation circuit of the generator G. With the breaker $a11$ open, both circuits can instead also be supplied from a power system M via a breaker $a3$. It is to be pointed out with respect to the FIGS. 4 through 7, that identical reference symbols will be used to indicate similar circuit devices as those shown in the FIGS. 1 through 3 for the purposes of simplifying the description to follow.

In the operational condition shown in FIG. 4, the output of the auxiliary generator HG is connected via a closed breaker $a4$ and a converter transformer $m3$ with the input of a converter $u1$, $u2$, which consists of a rectifier $u1$ and an inverter $u2$, which in the present case are connected with each other via an intermediate circuit. In the intermediate circuit, there is connected a closed switch $a6$ as well as a choke $k1$, which provides for an impressed intermediate circuit current. The inverter $u2$ is connected on the output side, via another closed breaker $a5$, to the armature of the generator G.

The output of the auxiliary generator HG is further connected, via a closed switch $a7$, an internal-consumption transformer $m5$ and a further switch $a8$, with the input of an auxiliary exciter rectifier $u3$ having controlled valves. This auxiliary exciter rectifier $u3$ is controlled by a control unit $u13$, which in turn may be controlled via its input 13 by a regulator (not shown), which is, for example, provided for controlling the armature voltage $U_{LA}$. The output of the auxiliary exciter rectifier $u3$ is connected to the excitation winding E of the generator G via a switch $a10$.

On the shaft W is mounted a magnet-wheel position transmitter P which times the control unit $u5$ of the inverter $u2$ in dependence on the position of the shaft W. The inverter $u2$ thus receives commutation commands in such manner that a torque is developed through the excitation field formed by the excitation winding E and the flux through the armature of the generator G. The magnet-wheel position transmitter P therefore advances the armature flux as soon as the magnet-wheel of the generator G has traversed an angle of, for example, 60 electrical degrees.

To keep the speed of rotation $n$ of the shaft W constant, a speed control arrangement, further described in the following, is provided. Through such speed control arrangement, the shaft W is maintained at a low desired speed $n^*$ of, for example, 100 RPM, (the turning speed $n_T$), without a hydraulic rotating device.

Referring again to FIG. 4, the magnet-wheel position transmitter serves to time not only the control unit $u5$, but also a frequency-voltage converter $u6$, having an output leading to a central start-up control $u7$. The magnet-wheel position transmitter P and the frequency-voltage converter $u6$ cooperate as a tachometer for determining the actual speed $n$ of the shaft W. The central start-up control $u7$ comprises, in addition to other functional components, a comparator $v2$, to which is fed the actual value of the speed of rotation $n$ by the frequency-voltage converter $u6$, and the desired value of the speed $n^*$ by a reference speed setting device $gl$. As a reference speed setting device $gl$, there is provided a potentiometer connected to a voltage source. The speed deviation ($n^*-n$) determined by the comparator $v2$ is fed to a speed control $x1$, at the output of which appears an output signal which is used as the armature-current reference value $I_A^*$. The comparator $v2$ and the speed control $x1$ may be combined in one building block, such as an integrated circuit. The desired value of the armature current $I_A^*$ is fed, via a controlled, two-pole double-throw switch $a12$ of relay contacts or a contactless switch, to the first input of an armature-current comparator $v1$. The second input of the latter is supplied with the actual value of the armature current $I_A$ via a rectifier $u11$, which is connected at the input of the rectifier $u1$ with a current transformer serving as the probe U. The armature-current comparator $v1$ is connected with the control unit $u8$ of the rectifier $u1$ via an armature-current regulator $u10$. Thus, the voltage and thereby also the current in the intermediate circuit of the converter $u1$, $u2$ is controlled as a function of the armature-current deviation $(I_A^* - I_A)$. The speed control arrangement provides for holding the speed of rotation $n$ of the shaft W at the desired speed of rotation $n^*$, and therefore at the turning speed $n_T$.

In the four modes of operation, line start, phase shifter operation, braking and acceleration by cold start, the double-throw switch $a12$ is in the left-hand or upper position, different from that shown in FIG. 4. In these modes of operation, the speed control $x1$ is therefore removed from the connection between the frequency-voltage converter $u6$ and the comparator $v1$, and the armature-current reference value $I_A^*$ is predetermined via a function generator $x2$ as a function of the measured actual speed $n$ of the shaft W and the mode of operation. The mode of operation can be set externally by a program selector $a13$ at the function generator $x2$. The program selector $a13$ stores the program commands transmitted via the lines $p$ and determines through them the mode of operation of the converter $u1$, $u2$. It thus essentially fulfills a switching function and is therefore shown as a switch in FIG. 4.

If the turning mode of operation, i.e., speed-controlled operation, is to be executed, the double-throw switch $a12$ is switched into the right-hand or lower position shown in the FIG. 4, by an externally supplied signal. In this fashion, the first input of the comparator $v1$ is switched from the output of the function generator $x2$ to the output of the speed control $x1$, and the output of the function generator $x2$ to the limiting input of the speed control $x1$. A maximum output limit $I_{Am}^*$, which is dependent on the actual speed of rotation $n$, is therefore preset into the speed control $x1$ via the function generator $x2$, which has been switched over at the same time to this mode of operation by means of the program selector $a13$. This switching operation therefore signifies a transition from regulated-current operation of the converter $u1$, $u2$ to regulated-speed operation with subordinated current regulation, with current limit control dependent on the mode of operation and the speed of rotation. Controls with limiting inputs are known per se. A voltage applied to the limiting input serves to limit the output voltage of the control to an appropriate value by means of diodes.

The central start-up control $u7$ is the central control for the starting-up arrangement. From it emanate, the control commands for all switches. The symbolically indicated control lines are designated by the numeral 1. The central start-up control $u7$ therefore comprises an additional number of functional elements, which are not shown in FIG. 4. There will be provided a supplementary discussion of these functional elements with the assistance of the FIG. 5. Specifically, the program selector $a13$ contained in the central start-up control $u7$ stores the program commands which are transmitted from the outside via the lines $p$ and determine the mode of operation. The modes of operation: line start, auxiliary (cold) start, phase shifter operation, braking and rotation at the turning speed are possible in the embodiment shown. Upon a command via the start-stop line $st$ the program selector $a13$ sets the control quantities essential for the converter $u1$, $u2$, these being the speed of rotation $n$, the excitation current $I_E$ and the armature current $I_A^*$. The program selector $a13$ provides these control quantities at the function generator $x2$, at a speed-monitoring device $x3$ and, indirectly, at an excitation-current monitoring device $x4$. It can further block the speed control $x1$. It is furthermore connected to a switch-actuating unit $x5$. The program commands can be set into the program selector $a13$ manually or also via the lines $p$ by an automatic mechanism.

Figure 5:
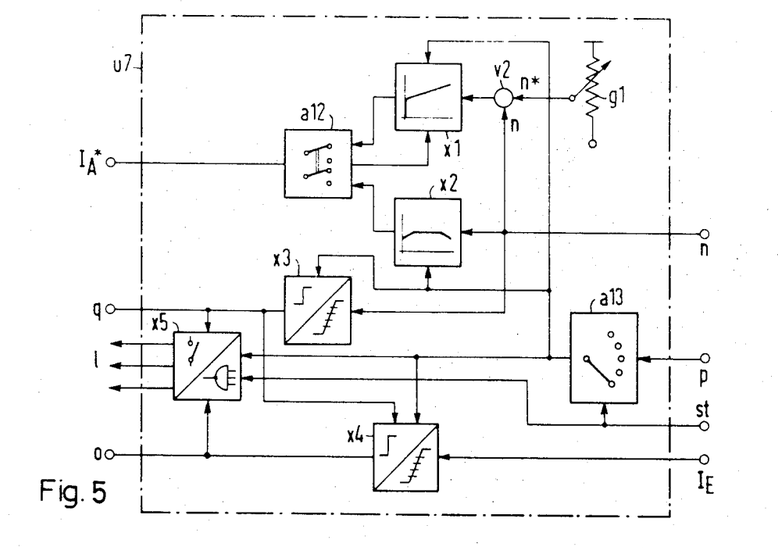
FIG. 5 shows details of the central start-up control shown in FIG. 4.

In the speed-monitoring unit $x3$, the actual speed of rotation $n$ is monitored by means of limit alarms to ascertain whether the speed value exceeds or falls below the speed limit values preset by the program selector $a13$. These limit values may be a minimum speed of ratation $n_{min}$, the turning speed $n_T$, a speed of rotation of, for example, $0.7\ n_N$, the nominal speed $n_N$, an overdrive speed $n_U$ and a maximum speed $n_{max}$. With the signals obtained, the switch actuating unit $x5$ is energized. In this manner, there are further switched over in the excitation-current monitoring unit $x4$, exciter-current limits. Finally, pulse shift commands are given via lines $p$ to the control unit $u5$ (FIG. 4) and external alarm and operation-monitoring devices (not shown) are influenced.

In the excitation-current monitoring unit $x4$, the excitation current $I_E$ which flows in the excitation winding E of the generator G and which is measured by means of a probe, not shown in FIG. 5, is monitored as to whether it exceeds or falls below the limits set by the program selector $a13$. These limits may be $I_E = O$, a minimum value $I_{Emin}$ and a value $I_{EN}$ required for the nominal speed of rotation $n_N$. The switch actuating unit $x5$ is energized by the output signals, and furthermore, external protective and alarm devices (not shown) are influenced via the line $o$.

In the switch-actuating unit $x5$, the output signals of the speed and the excitation current monitoring unit $x3$ and $x4$, respectively, are linked with the control commands coming from the program selector $a13$. Depending on start-stop commands and feedback signals from the switches, which likewise arrive via the lines $st$, ON and OFF commands for the converter and exciter switches, in FIG. 4, are formed.

Figure 6:
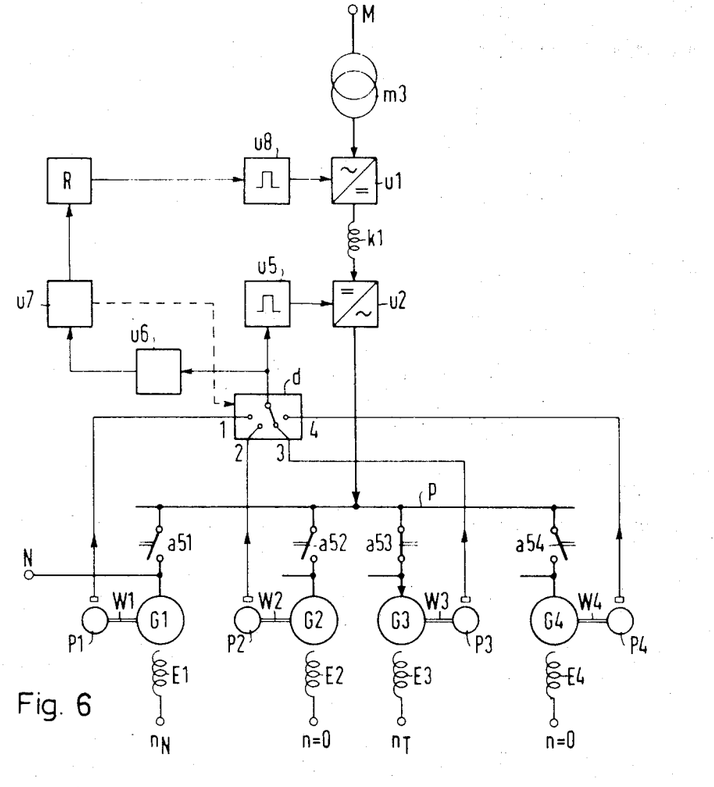
FIG. 6 shows a starting-up arrangement for starting up one or several generators.

Referring to FIG. 6 there is shown a start-up arrangement, by means of which one, or successively, several generators, coupled to one turbine each, can be accelerated to a predetermined speed. This speed may be either the separation speed $n_A$ which can, for example, be $n_A = 0.5\ n_N$, the nominal speed $n_N$, or also an overdrive speed $n_U$, which may, for example, be $n_U = 1.05\ n_N$. Omitting details, FIG. 6 shows only those components which are essential for an understanding of the start-up arrangement.

A converter $u1$, $u2$ with a choke $k1$ in the intermediate circuit is connected on the input side via a converter transformer $m3$ to a system M, and on the output side to a start-up bus $p$. There are provided four ($z = 4$) generators G1 to G4, which are coupled via shafts W1 to W4 to one turbine each (not shown). The excitation windings of these generators G1 to G4 are designated with E1 to E4. Their armature windings can be connected via four ($z = 4$) circuit breakers $a51$, $a52$, $a53$, and $a54$, respectively, which are controllable by the central start-up control $u7$, to the start-up bus $p$. On each of the shafts W1 to W4 is mounted a magnet-wheel position transmitter P1 to P4. The control unit $u5$ of the inverter $u2$ can be timed by each of the magnet-wheel position transmitters P1 to P4. For transmitting the timing pulses from the magnet-wheel position transmitters P1 to P4, a selector switch $d$ is provided, having the switch positions 1 to 4. Selector switch $d$ is preferably embodied, as contrasted with the presentation in the drawing, as a contactless switch. Each magnet-wheel position transmitter P1 to P4 can therefore be connected via the selector switch $d$ to the control unit $u5$. The switch position of the selector switch $d$ is determined by the central start-up control $u7$ via the control line indicated by the dashed line.

The input of the control unit $u5$ is furthermore connected with a frequency-voltage converter $u6$, the output voltage of which is a measure for the actual speed of rotation $n$ of the particular generator G1 to G4 to which the selector switch $d$ is set. This actual speed $n$ is fed to the central start-up control $u7$, which contains a speed control arrangement according to that shown and described with reference to FIG. 4. The central start-up control $u7$ is connected via a control device R, which was also explained in detail with aid of FIG. 4, to the control unit $u8$ of the rectifier $u1$.

At a point in time $t_1$, the breakers $a51$ to $a54$ and the switch $d$ are in the switch positions shown in FIG. 6. The breakers $a51$, $a52$ and $a54$ are therefore open, and the selector switch $d$ is in the switch position 3. The generator G1 is held at the nominal speed $n_N$ by the connected turbine, and its armature winding feeds, via a transformer, if desired, into an AC system N. The generators G2 and G4 are stopped ($n = O$). The generator G3 is connected via the closed breaker $a53$ to the converter $u1$, $u2$ and is operated, under the control of the speed control device, at a predetermined speed which is a constant turning speed $n_T$ of, for example, 100 RPM.

If there now exists the problem of accelerating the generator G4 to the nominal speed $n_N$, while the generator G3 is to continue to be turned, the procedure is as follows.

From a second point in time $t_2$ on, the central startup control $u7$ makes provision that the generator G3 is accelerated until, at a third point in time $t_3$, a predetermined release speed $n_F$ is reached. The latter may be, $n_F = 300$ RPM. When the generator G3 has reached the release speed $n_F$, the breaker $a53$ is opened, the breaker $a54$ is closed, and the selector switch $d$ is set to the switch position 4. From the point in time $t_3$ on, the generator G3 is therefore separated from the converter $u1$, $u2$. From now on, generator G3 is left to itself and can run down uncontrolled. At the same time the generator G4 is accelerated by the converter $u1$, $u2$, which is controlled via the central startup control $u7$ until it has reached the predetermined nominal speed $n_N$ of, for example, 3000 RPM. The run-down time of the generator G3, accelerated to the release speed $n_F$, is longer than the acceleration time of the generator G4. After the generator G4 is brought up to speed at the nominal speed of rotation $n_N$, the generator G3 will therefore still turn.

At a fourth point in time $t_4$, when the generator G4 has already reached the nominal speed $n_N$, the breaker $a54$ is opened again, the breaker $a53$ is closed and the selector switch $d$ is reset to the switch position 3. The generator G3 is therefore reconnected to the inverter $u2$, so that it is captured again at the turning speed $n_T$, with the speed control device enabled. Subsequently, the generator G2 can also be accelerated to a predetermined speed.

Figure 7:
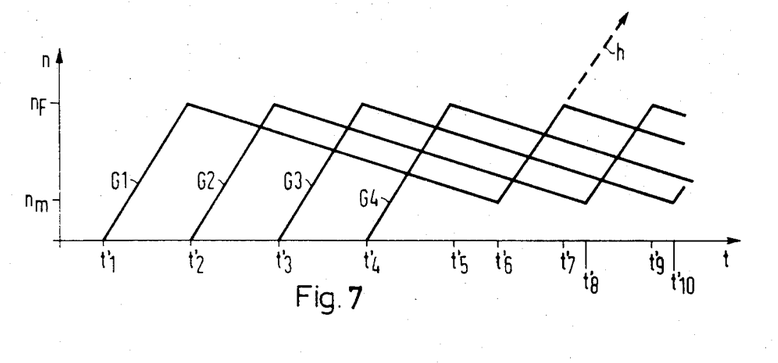
FIG. 7 shows a diagram in which the speed of four generators is plotted versus time, such generators being maintained in turning operation simultaneously.

In the explanation of the acceleration of the generator G4 and the simultaneous holding of another generator G3 in turning operation according to FIG. 6, it was assumed that the central start-up control $u7$ contains a speed control device. This assumption can be maintained also in the following case. In this case, however, a higher release speed $n_F$ is chosen and the speed setting device is set to such speed. Referring to FIGS. 6 and 7, it is to be explained that several generators G1 to G4 can be held in turning operation with a single converter $u1$, $u2$. However, in such situation, it must be permissible to have their speeds vary during the turning operation.

For the sake of simplicity it will be assumed that the generators G1 to G4, shown in FIG. 6, are initially at standstill ($n = O$), and that the breakers $a51$ to $a54$ are initially open. At a point in time $t'_1$, as indicated in FIG. 7, the breaker at $a51$ is closed and the selector switch $d$ is set to the switch position 1. The central start-up control $u7$ provides for accelerating the generator G1. By means of the tachometer P1 and $u6$, the central start-up control $u7$ determines when the generator G1 has reached a predetermined release speed $n_F$ of, for example, 450 RPM. At this point in time $t'_2$ the central start-up control $u7$ insures that the selector switch $d$ is transferred into the switch position 2, that the breaker $a51$ is opened again and that the breaker $a52$ is closed. Therefore, the generator G2 is accelerated from now on. In the meantime, the generator G1 runs uncontrolled and its speed decreases somewhat due to the friction losses at the shaft W1.

When the generator G2 has reached the predetermined release speed $n_F$, the selector switch $d$ is switched at the point in time $t'_3$ into the switch position 3, after the breaker $a52$ has been opened and the breaker $a53$ closed. At a point $t'_4$, at which the generator G3 has reached its release speed $n_F$, such generator G3 is also released by the opening of the breaker $a53$ and the generator G4 is accelerated after the breaker $a54$ is closed. When at a point in time $t'_5$, this generator G4, too, has been accelerated, the speed $n$ of the generator G1 has in the meantime decreased further because of the friction losses. The speed decrease was assumed as linear in FIG. 7.

At a point in time $t'_6$, the generator G1 has reached, according to FIG. 7, a predetermined minimum speed $n_m$, which is only a fraction of the release speed $n_F$, for example, 0.3 $n_F$. It will be seen from FIG. 7 that the run-down time ($t'_6 - t'_1$) of the generator G1 is longer than the acceleration time ($t'_5 - t'_1$) of all generators G1 to G4 up to the release speed $n_F$. In order to prevent stopping, the breaker $a54$ is opened at this time $t'_6$, the selector switch $d$ is set to the switch position 1 and the breaker $a51$ is closed. The generator G1 is therefore picked up and again accelerated to the release speed $n_F$.

This switching cycle of the breakers $a51$ to $a54$ and the switch $d$ is repeated cyclically. It is given once more as a summary in the following Table:

| Time | Circuit Breaker (Switch) | | | | |
|------|------|------|------|------|---|
|      | a51  | a52  | a53  | a54  | d |
| $t'_1$ | x    |      |      |      | 1 |
| $t'_2$ |      | x    |      |      | 2 |
| $t'_3$ |      |      | x    |      | 3 |
| $t'_4$ |      |      |      | x    | 4 |
| $t'_5$ | x    |      |      |      | 1 |
| $t'_6$ |      | x    |      |      | 2 |

In the table, an x indicates that the breaker in question is closed. The excitation winding E1 to E4 always carry excitation current during acceleration.

It should be pointed out that, in between cycles, a generator can always be accelerated to the predetermined higher speed $n_A$, $n_N$ or $n_U$ instead of to the release speed $n_F$. For example, the generator G1 speed starting at the point $t'_6$ is indicated by the dashed line $h$ in FIG. 7. This generator is then no longer considered from the next cycle on, when switching for maintenance of the turning operation occurs.

Although the above description is directed to the preferred embodiments of the invention, it is noted that other variations and modifications will be apparent to those skilled in the art and, therefore, may be made without departing from the spirit and scope of the present disclosure.

What is claimed is:

1. Apparatus for starting up a gas turbine unit or the pump turbine of a pump storage unit, comprising:
   a generator which is coupled to the turbine of said gas turbine or pump storage unit;
   power supply means for said gnerator; and
   a static semiconductor frequency converter connected between said power supply means and said generator during startup of the turbine, said frequency converter including a controllable rectifier which is connected on its input side to said power supply means, and a controllable inverter which is connected on its output side to said generator, said inverter being connected with said rectifier via an intermediate DC choke circuit, said inverter having commutating means, said inverter being timed during the start-up by a position transmitter which is coupled to the shaft of said generator, as a function of the position of said shaft, and said frequency converter providing a variable output frequency and accelerating said generator synchronously as a synchronous motor from zero speed until a predetermined speed is reached.

2. Apparatus as recited in claim 1, wherein said rectifier is connected on its input side to an auxiliary starting arrangement serving as power supply means.

3. Apparatus as recited in claim 1, wherein said semiconductor converter is provided as a braking device for synchronously decelerating said generator.

4. Apparatus as recited in claim 1, wherein said inverter is designed as a self-commutating inverter with quenching means connected between said inverter and said rectifier.

5. Apparatus as recited in claim 1, wherein the intermediate-circuit current is made zero for the commutation of the inverter, in the event that the commutation voltage is absent because the speed is too low.

6. Apparatus as recited in claim 1, wherein the exciter winding of said generator is fed during starting up from an auxiliary voltage source, and upon reaching a predetermined speed said rectifier is connected as the excitation rectifier to said exciter winding in lieu of said auxiliary voltage source, my means of at least one circuit breaker.

7. Apparatus as recited in claim 1, also comprising a voltage control for the voltage at the output of the inverter or at the input of the generator, respectively, which voltage control, after reaching a maximum permissible output voltage of said inverter, reduces, during starting, the current through the exciter winding of the generator in such a manner that the permissible output voltage is not exceeded.

8. Apparatus as recited in claim 1, further comprising a speed control arrangement at the semiconductor converter for maintaining the speed of rotation of the shaft of said generator constant.

9. Apparatus as recited in claim 8, further comprising a tachometer for determining the actual speed of the shaft; a reference-speed setting device with adjustable reference speed which is connected, together with said tachometer, to a comparator; a speed control connected to said comparator; the output signal of said speed control being fed as the reference value of the armature current to a first input of an armature-current comparator having a second input which is fed from a probe for the actual value of the armature current; and a control unit connected to said armature current comparator via an armature-current regulator.

10. Apparatus as recited in claim 9, wherein a maximum output limit value, dependent on the actual speed, is set into the speed control by means of a function generator.

11. Apparatus as recited in claim 10, wherein said speed control can be removed from the connection between said function generator and said control unit by means of a double-throw switch, when switching to another mode of operation.

12. Apparatus as recited in claim 9, wherein said tachometer comprises a magnet-wheel position transmitter with a following frequency-voltage converter.

13. Apparatus as recited in claim 1, wherein said inverter is designed as a self-commutating inverter with quenching means connected between said inverter and said rectifier.

14. Apparatus as recited in claim 1, wherein the intermediate-circuit current is made zero for the commutation of the inverter, in the event that the commutation voltage is absent because the speed is too low.

15. Apparatus as recited in claim 3, wherein the exciter winding of said generator is fed during starting up from an auxiliary voltage source, and upon reaching a predetermined speed said rectifier is connected as the excitation receifier to said exciter winding in lieu of said auxiliary voltage source, by means of at least one circuit breaker.

16. Apparatus as recited in claim 2, also comprising voltage control for the voltage at the output of the inverter or at the input of the generator, respectively, which voltage control, after reaching a maximum permissible output voltage of said inverter, reduces, during starting, the current through the exciter winding of the generator in such a manner that the permissible output voltage is not exceeded.

17. Apparatus as recited in claim 2, further comprising a speed control arrangement at the semiconductor converter for maintaining the speed of rotation of the shaft of said generator constant.

18. Method for starting-up a gas turbine unit or a pump storage unit having a generator coupled to a turbine thereof, comprising:
  connecting said generator to a supply voltage by means of a frequency converter during the start-up acceleration in a manner which operates said generator as a synchronous motor, said frequency converter including a controllable rectifier which is connected on its input side to said supply voltage and a controllable inverter which is connected on its output side to said generator, said inverter being connected with said rectifier via an intermediate DC choke circuit, and said inverter having commutating means;
  accelerating said generator synchronously, by said frequency converter, as a synchronous motor from zero speed until a predetermined speed is reached;
  disconnecting said generator from said frequency converter when a predetermined speed is reached; and
  timing said frequency converter during starting-up by generating commutation commands which depend on the position of the shaft of said generator.

19. Method as recited in claim 18, further comprising, accelerating said generator of a gas turbine set by means of the frequency converter up to a disengagement speed which corresponds to about one-half the nominal speed, at which said generator is subsequently accelerated by the turbine, with the frequency converter disconnected, to the full nominal speed which corresponds to the frequency of the system to be supplied.

20. Method as recited in claim 18, further comprising, accelerating the generator of a pump storage unit by means of said frequency converter up to a full nominal speed.

21. Method as recited in claim 18, further comprising, accelerating said generator, with the turbine not coupled, by means of said frequency converter to beyond the nominal speed of the generator which corresponds to the frequency of the system to be supplied, whereby said generator is subsequently synchronized when running down.

22. Method as recited in claim 18, wherein several generators are turned by connecting a number of generators in cyclic succession, accelerating the respectively connected generator to a predetermined release speed after which it subsequently runs down uncontrolled until it is again accelerated in the next cycle to the release speed.

23. Method as recited in claim 18, further comprising: at a first point in time, connecting a first generator, which is selected from a number of generators, to an inverter of said frequency converter; turning said generator at a predetermined desired speed with a speed control device enabled; from a second point in time, accelerating said first generator until a predetermined release speed is reached; from a third point in time, accelerating a second generator to a predetermined speed by means of said frequency converter, while the first generator is disconnected from said frequency converter and runs down uncontrolled; and from a fourth point in time, reconnecting said first generator to said inverter, whereby the speed control arrangement is enabled in said process.

* * * * *